US006686954B1

(12) United States Patent
Kitaguchi et al.

(10) Patent No.: US 6,686,954 B1
(45) Date of Patent: Feb. 3, 2004

(54) APPARATUS AND METHOD FOR CORRECTION OF A DEVIATION OF DIGITAL CAMERA

(75) Inventors: Takashi Kitaguchi, Kanagawa (JP); Yasuhiro Sato, Kanagawa (JP); Norihiko Murata, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/337,400

(22) Filed: Jun. 22, 1999

(30) Foreign Application Priority Data

Jun. 26, 1998 (JP) .......................................... 10-180493

(51) Int. Cl.⁷ .............................................. H04N 5/228
(52) U.S. Cl. .............................. 348/208.1; 348/208.13; 348/219.1; 396/53
(58) Field of Search ......................... 348/218.1, 219.1, 348/208.1–208.16; 396/52–59

(56) References Cited

U.S. PATENT DOCUMENTS

| | | | | |
|---|---|---|---|---|
| 4,543,601 A | * | 9/1985 | Harada et al. | 348/219.1 |
| 4,734,726 A | | 3/1988 | Takahashi et al. | |
| 4,780,739 A | * | 10/1988 | Kawakami et al. | 348/208.99 |
| 4,998,164 A | * | 3/1991 | Endo et al. | 348/219.1 |
| 5,172,233 A | * | 12/1992 | Yoshihara et al. | 348/208.1 |
| 5,502,483 A | * | 3/1996 | Takase et al. | 348/208.1 |
| 5,502,484 A | * | 3/1996 | Okada | 348/208.1 |
| 5,523,811 A | * | 6/1996 | Wada et al. | 348/118 |
| 5,654,752 A | * | 8/1997 | Yamazaki | 348/208.1 |
| 5,657,080 A | * | 8/1997 | Sekine | 348/208.1 |
| 5,850,254 A | * | 12/1998 | Takano et al. | 348/148 |
| 5,861,915 A | * | 1/1999 | Sato et al. | 348/208.1 |
| 5,867,213 A | * | 2/1999 | Ouchi | 348/208.1 |
| 6,285,400 B1 | * | 9/2001 | Hokari | 348/374 |

FOREIGN PATENT DOCUMENTS

| | | |
|---|---|---|
| JP | 64-78581 | 3/1989 |
| JP | 2-103023 | 4/1990 |
| JP | 6-46322 | 2/1994 |

* cited by examiner

*Primary Examiner*—Wendy R. Garber
*Assistant Examiner*—Lin Ye
(74) *Attorney, Agent, or Firm*—Oblon, Spivak, McClelland, Maier & Neustadt, P.C.

(57) ABSTRACT

An apparatus and a method for correction of a deviation of an imaging sensor of a digital camera in which an image of an object or a scene is formed on an image plane of the imaging sensor to output an image signal, are disclosed. A quantity of rotation of the digital camera causing a deviation of the imaging sensor from a reference position to occur, is detected. A change of a positional angle of the imaging sensor is calculated based on the detected rotation quantity. A target vector is calculated based on the calculated positional angle change, the target vector describing a magnitude and a direction of an inverse movement of the imaging sensor needed to reach the reference position and cancel the deviation. Movement of the imaging sensor is controlled based on the calculated target vector, so that the imaging sensor is moved back to the reference position thus correcting the deviation. The calculation of the target vector and the movement of the imaging sensor are executed within an image acquisition time for a single frame of the image signal.

10 Claims, 6 Drawing Sheets

APPARATUS AND METHOD FOR CORRECTION OF A DEVIATION OF DIGITAL CAMERA

BACKGROUND OF THE INVENTION (1) Field of the Invention

The present invention relates to an aparatus and a method for correction of a deviation of an imaging sensor of a digital camera which may be produced by a slight oscillation of the human hand in taking a photograph using the digital camera.

(2) Description of the Related Art

Recently, the rapid growth of digital cameras for business uses as well as for personal uses has been experienced. Developments of digital cameras having a small size and a light weight with low cost will be increased. With the developments of such digital cameras, attention will be focused on correction of a deviation of a digital camera caused by a slight oscillation of the human hand when taking a photograph with the digital camera.

If an imaging sensor of the digital camera deviates from a reference position due to the oscillation of the operator, a dim image will be reproduced by the digital camera. If the deviation of the imaging sensor is not corrected, it is difficult for the digital camera to provide good quality of a reproduced image. Therefore, there is a demand for a digital camera which is capable of automatically correcting a deviation of the imaging sensor which may be produced by a slight oscillation of the operator who takes a photograph with the digital camera.

In the fields of video cameras, techniques for correction of an image deviation of the video camera are known. For example, Japanese Laid-Open Patent Application No.64-78581 discloses a video camera deviation correcting device. This deviation correcting device includes a frame memory which stores an image signal. An image deviation caused by a camera deviation is detected from a difference in image data between two frames in a sequence of continuously processed image frames. When an image deviation is detected, the image data is processed with the frame memory by controlling the read/write timing of the frame memory so as to correct the image deviation.

In the device of the above publication, an acceleration sensor is provided to detect a camera motion. However, there is provided no moving mechanism which moves the imaging sensor based on the detected motion, so as to cancel the camera deviation having caused the image deviation.

Japanese Laid-Open Patent Application No. 2-103023 discloses a video camera deviation correcting device. The deviation correcting device includes horizontal and vertical line sensors which detect an image deviation caused by a camera deviation. Such an image deviation is detected from a difference in image data between two frames in a sequence of continuously processed image frames. When an image deviation is detected, the imaging sensor is moved on a plane perpendicular to the optical axis of the video camera lens by a moving mechanism so as to correct the image deviation.

Japanese Laid-Open Patent Application No. 6-46322 discloses an imaging apparatus having a deviation correcting function. The deviation correcting function of the imaging apparatus is applied to a video camera. A camera motion is detected by a vibration sensor. When a camera motion is detected, the imaging sensor is moved on a plane perpendicular to the optical axis of the video camera lens by a moving mechanism such that the center of the imaging sensor is aligned with the optical axis of the video camera lens.

The conventional techniques of the above publications are applied to the video cameras in which a sequence of image frames is continuously acquired and processed. However, it is very difficult to directly apply the video camera techniques to digital cameras in which a single frame of image data is acquired in an image acquisition time. In the case of digital cameras, it is necessary to correct a deviation of the imaging sensor of the digital camera within an image acquisition time for a single frame, in order to eliminate the degradation of quality of a reproduced image due to a slight oscillation of the operator.

Further, in the conventional techniques of the above publications, there is no teaching about how to detect the magnitude and the direction of an imaging sensor deviation with a required level of accuracy, and how to move the imaging sensor based on the detection result in an effective manner so as to cancel the imaging sensor deviation. It is desirable to provide such new techniques for digital cameras, in order to incorporate therein the functions to effectively correct a deviation of the imaging sensor and to reliably prevent the degradation of quality of a reproduced image due to a slight oscillation of the operator in taking a photograph with the digital camera.

SUMMARY OF THE INVENTION

An object of the present invention is to provide a novel and useful deviation correcting apparatus and method in which the above-described problems are eliminated.

Another object of the present invention is to provide a digital camera deviation correcting apparatus which reliably prevents the degradation of quality of a reproduced image of the digital camera due to a slight oscillation of the operator by correcting a deviation of the imaging sensor of the digital camera in an effective manner through an accurate detection of the imaging sensor deviation and a controlled movement of the imaging sensor based on the detection result.

Still another object of the present invention is to provide a digital camera deviation correcting method which reliably prevents the degradation of quality of a reproduced image of the digital camera due to a slight oscillation of the operator by correcting a deviation of the imaging sensor of the digital camera in an effective manner through an accurate detection of the imaging sensor deviation and a controlled movement of the imaging sensor based on the detection result.

The above-mentioned objects of the present invention are achieved by an apparatus for correcting a deviation of an imaging sensor of a digital camera in which an image of an object or a scene is formed on an image plane of the imaging sensor so that the imaging sensor outputs an image signal, which comprises: a rotation detecting unit which detects a quantity of rotation of the digital camera causing a deviation of the imaging sensor from a reference position to occur; a positional angle calculating unit which calculates a change of a positional angle of the imaging sensor based on the rotation quantity detected by the rotation detecting unit; a target vector calculating unit which calculates a target vector based on the positional angle change calculated by the positional angle calculating unit, the target vector describing a magnitude and a direction of an inverse movement of the imaging sensor needed to reach the reference position and cancel the deviation; and a movement control unit which controls movement of the imaging sensor based on the target vector calculated by the target vector calculating unit, so that the imaging sensor is moved back to the reference position thus correcting the deviation, wherein the calculation of the target vector and the movement of the imaging sensor are executed within an image acquisition time for a single frame of the image signal.

The above-mentioned objects of the present invention are achieved by a method of correcting a deviation of an imaging sensor of a digital camera in which an image of an object or a scene is formed on an image plane of the imaging sensor so that the imaging sensor outputs an image signal, comprising the steps of: detecting a quantity of rotation of the digital camera causing a deviation of the imaging sensor from a reference position to occur; calculating a change of a positional angle of the imaging sensor based on the detected rotation quantity; calculating a target vector based on the calculated positional angle change, the target vector describing a magnitude and a direction of an inverse movement of the imaging sensor needed to reach the reference position and cancel the deviation; and controlling movement of the imaging sensor based on the calculated target vector, so that the imaging sensor is moved back to the reference position thus correcting the deviation, wherein the calculation of the target vector and the movement of the imaging sensor are executed within an image acquisition time for a single frame of the image signal.

In the digital camera deviation correcting apparatus and method of the present invention, a quantity of rotation and/or a quantity of translation of the digital camera, causing a deviation of the imaging sensor from the reference position to occur, is detected by a rotation detecting unit and/or a translation detecting unit. A change of the positional angle of the imaging sensor is calculated based on the detected rotation quantity. A change of the quantity of translation of the imaging sensor is calculated based on the detected translation quantity. A target vector is calculated based on the calculated positional angle change and the calculated translation quantity change, the target vector describing a magnitude and a direction of an inverse movement of the imaging sensor needed to reach the reference position and cancel the deviation. Movement of the imaging sensor is controlled based on the calculated target vector, so that the imaging sensor is moved back to the reference position thus correcting the deviation. The calculation of the target vector and the movement of the imaging sensor are executed within an image acquisition time for a single frame of the image signal. It is possible for the digital camera incorporating the principles of the present invention to provide good quality of a reproduced image as the degradation of quality of a reproduced image due to a slight oscillation of the operator is effectively prevented. It is possible that the apparatus and the method of the present invention effectively corrects a deviation of the imaging sensor of the digital camera through an accurate detection of the imaging sensor deviation and a controlled movement of the imaging sensor based on the detection result.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1A:
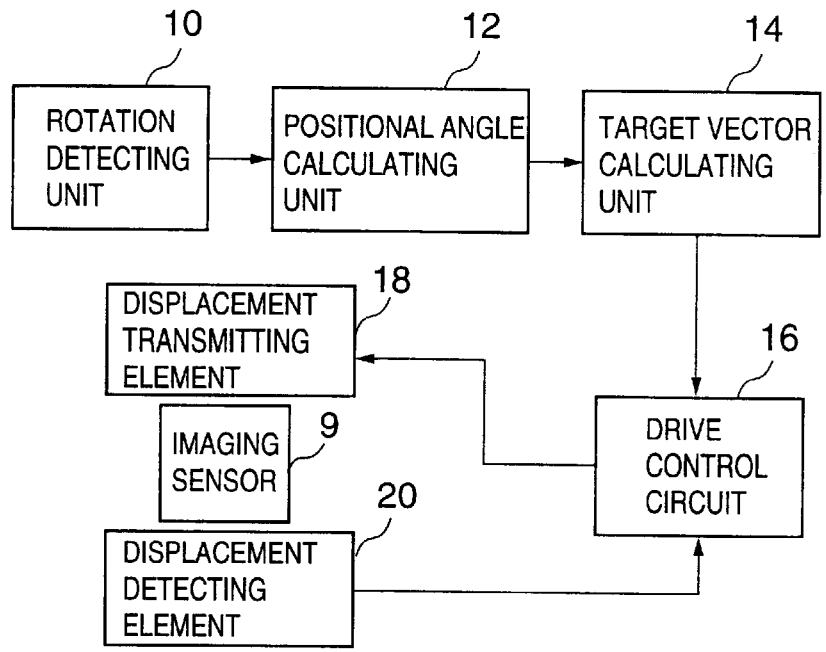
FIG. 1A is a block diagram of one embodiment of a digital camera deviation correcting apparatus of the present invention.

FIG. 1A shows a digital camera deviation correcting apparatus embodying the present invention.

In a digital camera to which one embodiment of the present invention is applied, an image of an object or a scene is formed on an image plane of an imaging sensor so that the imaging sensor outputs a digital image signal. The digital camera deviation correcting apparatus of the present embodiment is provided for correcting a deviation of the imaging sensor of the digital camera which may be produced by a slight oscillation of the human hand in taking a photograph using the digital camera.

As shown in FIG. 1A, the digital camera deviation correcting apparatus of the present embodiment includes a rotation detecting unit 10 which detects a quantity of rotation of the digital camera which causes a deviation of an imaging sensor 9 from a reference position to occur. The imaging sensor 9 is comprised of a CCD (charge-coupled device) or a CMOS (complementary metal oxide semiconductor) device. The rotation detecting unit 10 may include a set of acceleration sensors provided to output signals indicative of accelerations of the digital camera along an X axis, a Y axis and a Z axis of a world coordinate system, and a set of magnetic sensors provided to output signals indicative of magnetic fields of the digital camera along the X axis, the Y axis and the Z axis of the world coordinate system.

A positional angle calculating unit 12 calculates a change of a positional angle of the imaging sensor 9 based on the rotation quantity detected by the rotation detecting unit 10. The positional angle calculating unit 12 may include a set of analog-to-digital converters and a microprocessor with a memory. A target vector calculating unit 14 calculates a target vector based on the positional angle change calculated by the positional angle calculating unit 12, the target vector describing a magnitude and a direction of an inverse movement of the imaging sensor 9 needed to reach the reference position and cancel the deviation. The target vector calculating unit 14 may include a set of digital-to-analog converters and a microprocessor with a memory.

In the digital camera deviation correcting apparatus of FIG. 1A, a drive control circuit 16 drives a displacement transmitting element 18 connected to the imaging sensor 9, based on the target vector calculated by the target vector calculating unit 14. The imaging sensor 9 is moved in the inverse direction by a given displacement by the displacement transmitting element 18. During the movement of the imaging sensor 9, the resulting displacement of the imaging sensor 9 given by the displacement transmitting element 18 is detected by a displacement detecting element 20 connected to the imaging sensor 9. A detection signal output by the displacement detecting element 20 is supplied to the drive control circuit 16. A closed loop control of the imaging sensor movement is carried out. Based on the detection signal supplied, the drive control circuit 16 continues to drive the displacement transmitting element 18 until the imaging sensor 9 reaches the reference position. The drive control circuit 16, the displacement transmitting element 18 and the displacement detecting element 20 constitute a movement control unit which controls movement of the imaging sensor 9 so that the imaging sensor 9 is moved back to the reference position. Hence, the deviation of the imaging sensor 9 from the reference position is corrected by the movement control unit of the present embodiment.

The displacement transmitting element 18 is comprised of a set of piezoelectric elements which change dimensions so as to transmit displacement to the imaging sensor 9 based on a drive voltage applied thereto. The displacement detecting element 20 is comprised of a set of piezoelectric elements which produce a voltage output to the drive control circuit 16 when stressed by the imaging sensor 9.

In the digital camera deviation correcting apparatus of the present invention, the closed loop control of the imaging sensor movement is not necessarily required. An open loop control of the imaging sensor movement may be applied to the movement control unit of the digital camera deviation correcting apparatus. In such a case, the displacement detecting element 20 and the feedback line to the drive control circuit 16 as in the apparatus of FIG. 1A may be omitted. In any case, the deviation of the imaging sensor 9 caused by a slight oscillation of the operator can be corrected by the movement control unit.

It is possible for the digital camera deviation correcting apparatus of the above-described embodiment to provide good quality of a reproduced image as the degradation of quality of a reproduced image due to a slight oscillation of the operator is reliably prevented. It is possible to effectively correct a deviation of the imaging sensor 9 of the digital camera through an accurate detection of the imaging sensor deviation and a controlled movement of the imaging sensor based on the detection result.

In the digital camera deviation correcting apparatus of the present embodiment, the calculation of the target vector and the movement of the imaging sensor are executed within an image acquisition time for a single frame of the image signal, which will be described later.

Figure 1B:
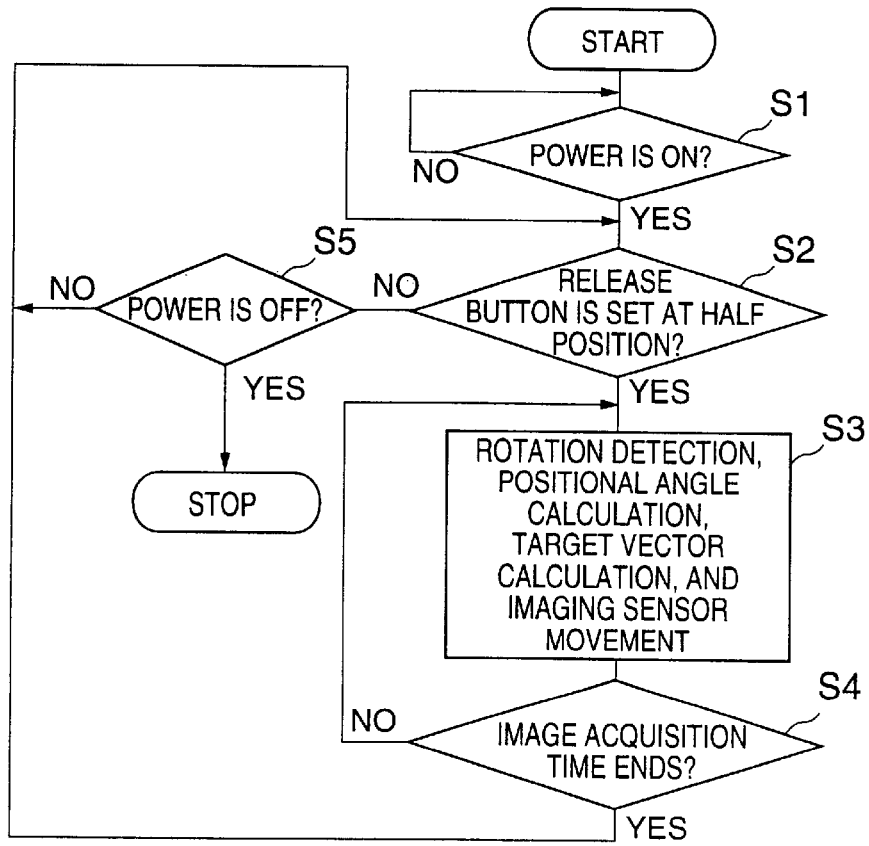
FIG. 1B is a flowchart for explaining one embodiment of a digital camera deviation correcting method of the present invention.

FIG. 1B is a flowchart for explaining a digital camera deviation correcting method embodying the present invention. The procedures of FIG. 1B are executed by the digital camera deviation correcting apparatus of FIG. 1A.

As shown in FIG. 1B, at a start, the digital camera is set in a waiting condition. Step S1 determines whether a power switch (not shown) of the digital camera is turned ON. When the power switch is turned ON, step S2 determines whether a release button (not shown) of the digital camera is set at a half position. When the release button is set at the half position, it is determined that the function of correction of a deviation of the digital camera is allowed to start.

When the result at the step S2 is affirmative, step S3 carries out the digital camera deviation correcting procedures with the digital camera deviation correcting apparatus of FIG. 1A. Namely, in the step S3, the rotation detection, the positional angle calculation, the target vector calculation and the imaging sensor movement are executed by the elements of the digital camera deviation correcting apparatus of FIG. 1A. After the step S3 is performed, step S4 determines whether an image acquisition time for a single frame of image data has elapsed. Many digital cameras are adapted to use the NTSC standard, and the image acquisition time for one frame is normally 1/30 seconds. It is necessary to correct a deviation of the imaging sensor 9 of the digital camera within the image acquisition time for one frame. When the image acquisition time has not yet elapsed, the step S3 is repeated. When the image acquisition time has already elapsed, the step S2 is repeated.

When the result at the step S2 is negative, it is determined that the function of correction of a deviation of the digital camera is not allowed to start. Step S5 determines whether the power switch is turned OFF. When the power switch is turned OFF, the procedures of FIG. 1B terminate. When the result at the step S5 is negative (the power switch is ON), the step S2 is repeated.

According to the digital camera deviation correcting method of FIG. 1B, the digital camera deviation correcting procedures in the step S3 are carried out before the image acquisition of a single frame of image data is complete. It is possible for the digital camera deviation correcting method of the above-described embodiment to provide good quality of a reproduced image as the degradation of quality of a reproduced image due to a slight oscillation of the operator is reliably prevented. It is possible to effectively correct a deviation of the imaging sensor 9 of the digital camera through an accurate detection of the imaging sensor deviation and a controlled movement of the imaging sensor based on the detection result.

Figure 3:
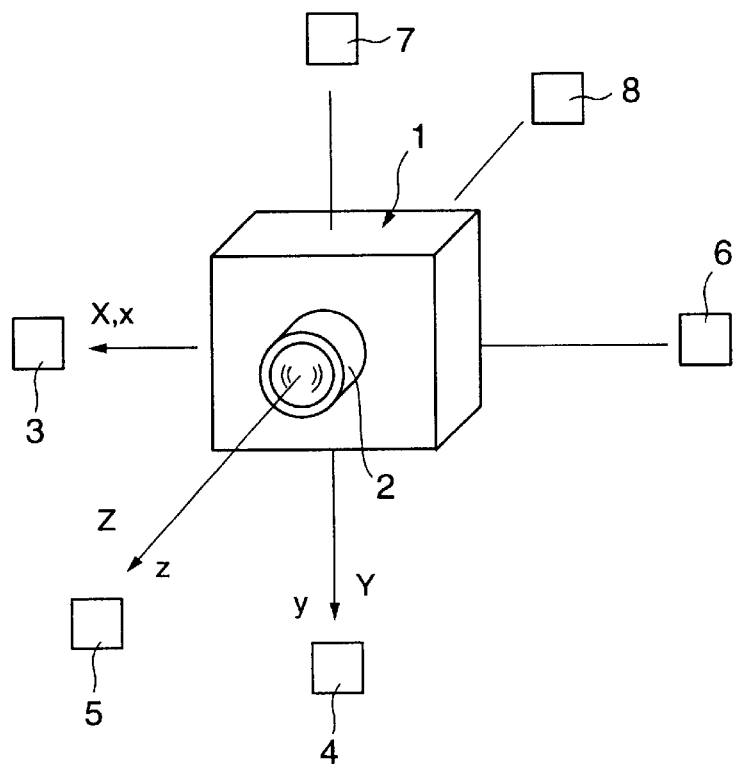
FIG. 3 is a diagram for explaining a camera coordinate system and a world coordinate system used to execute a positional angle calculation in the digital camera deviation correcting apparatus of the present invention.

FIG. 3 shows a camera coordinate system and a world coordinate system used to execute the positional angle calculation in the digital camera deviation correcting apparatus of the present embodiment.

As shown in FIG. 3, the digital camera to which one embodiment of the present invention is applied generally has a main body 1 and an optical system (camera lens) 2. A camera coordinate system (x, y, z) and a world coordinate system (X, Y, Z) are selected as shown in FIG. 3. Suppose that, initially, the digital camera was in a reference position, in the sense that the center of the digital camera (or the center of the image plane of the imaging sensor therein) was at the origin of the world coordinate system, and all the axes of both the systems were aligned.

The main body 1 of the digital camera is fixed to the camera coordinate system. An optical axis of the optical system 2 is aligned with the z axis of the camera coordinate system, which was initially aligned with the Z axis of the world coordinate system. The Y axis of the world coordinate system is taken to accord with the direction of gravity. The Z axis is taken to accord with the direction of the north pole of the earth. The X axis of the world coordinate system is perpendicular to both the Y axis and the Z axis.

As shown in FIG. 3, in the digital camera, acceleration sensors 3, 4 and 5 are provided to output signals indicative of accelerations of the digital camera along the X axis, the Y axis and the Z axis, respectively. Further, magnetic sensors 6, 7 and 8 are provided to output signals indicative of magnetic fields of the digital camera along the X axis, the Y axis and the Z axis, respectively. The acceleration sensors 3, 4 and 5 and the magnetic sensors 6, 7 and 8 constitute the rotation detecting unit of the digital camera deviation correcting apparatus of the present embodiment.

Assume that the digital camera was initially in the reference position at a time t, and a deviation of the digital camera (or a deviation of the imaging sensor therein) from the reference position is produced at a following time (t+1) by a slight oscillation of the human hand in taking a photograph using the digital camera. In this assumption, as the deviating movement of the digital camera is considerably small in quantity, it is achieved only by rotation with no translation taking place. As a result of the above deviation, the digital camera is rotated from the reference position about the Y axis by a rotation angle $\theta y(t)$, about the X axis by a rotation angle $\theta x(t)$, and about the Z axis by a rotation angle $\theta z(t)$ to a new position. Specifically, the assumption is that the deviating movement of the digital camera from the reference position to the new position is achieved by three rotation steps: rotation of any point of the digital camera about the Y axis, rotation of the point of the digital camera about the X axis, and rotation of the point of the digital camera about the Z axis, in this order. Generally, the application of these rotation transformations can be represented by rotation matrices $Ry(t)$, $Rx(t)$ and $Rz(t)$, and the application of the inverse rotation transformations can be represented by the inverse rotation matrices $Ry^{-1}(t)$, $Rx^{-1}(t)$ and $Rz^{-1}(t)$.

In addition, assume that, at the time t, the output signals of the acceleration sensors 3, 4 and 5 were (Ax(t), Ay(t), Az(t)) (which is represented by an acceleration matrix [A(t)]), and the output signals of the magnetic sensors 6, 7 and 8 were (Mx(t), My(t), Mz(t)) (which is represented by a magnetic field matrix [M(t)]).

As the digital camera was initially in the reference position at the time t, the following equation can be obtained.

$$Ry(t)Rx(t)Rz(t)[A(t)] = \begin{bmatrix} 0 \\ 1 \\ 0 \end{bmatrix}$$

From the above equation, the rotation angles $\theta x(t)$ and $\theta z(t)$ of the imaging sensor are determined as follows.

$$\theta x(t) = -\sin^{-1}(Az(t)),$$

$$\theta z(t) = \sin^{-1}(Ax(t)/\cos \theta x(t)) \qquad (1)$$

Further, $$Rx(t)Rz(t)[M(t)] = \begin{bmatrix} Mx' \\ My' \\ Mz' \end{bmatrix}, \begin{bmatrix} 0 \\ My'' \\ Mz'' \end{bmatrix} = Ry(t) \begin{bmatrix} Mx' \\ My' \\ Mz' \end{bmatrix}$$

From the above equations, the rotation angle $\theta y(t)$ of the imaging sensor is determined as follows, $$\theta y(t) = \sin^{-1}\{Mx'/\sqrt{(Mx'^2 + Mz'^2)}\} \qquad (2)$$

The application of the rotation transformations at the time (t+1) can be represented as follows, $$R'(t+1) = \{Ry(t)Rx(t)Rz(t)\}^{-1}Ry(t+1)Ry(t+1)Rz(t+1) \qquad (3)$$

From the above equation, a change of the positional angles of the imaging sensor of the digital camera between the initial time t and the following time (t+1) can be determined.

Figure 4:
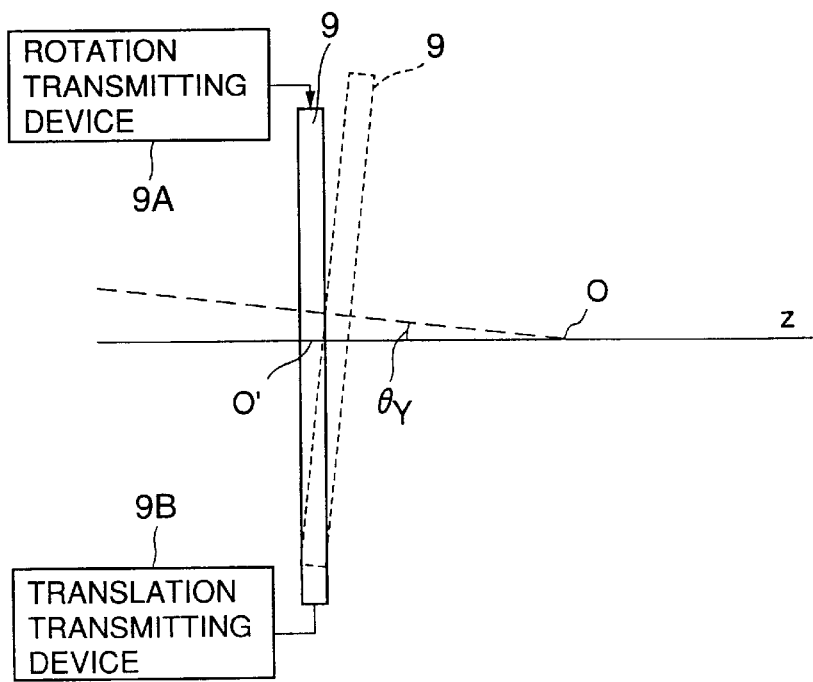
FIG. 4 is a diagram for explaining the principles of a target vector calculation and an imaging sensor movement executed in the digital camera deviation correcting apparatus of the present invention.

FIG. 4 shows the principles of the target vector calculation and the imaging sensor movement executed in the digital camera deviation correcting apparatus of FIG. 1A.

In FIG. 4, reference numeral 9 indicates the imaging sensor of the digital camera. The center of the imaging sensor 9 is indicated by "O" in FIG. 4. The solid line in FIG. 4 denotes the reference position of the imaging sensor 9 in the digital camera, and the z axis of the camera coordinate system (which accords with the axial direction of the optical system 2 of the digital camera) is aligned with the Z axis of the world coordinate system. The y axis of the camera coordinate system is perpendicular to the paper of FIG. 4.

The imaging sensor 9 is comprises of a CCD. As shown in FIG. 4, a rotation transmitting device 9A is connected to the imaging sensor 9, and this rotation transmitting device 9A is comprised of a set of voice coil motors which apply rotation to the imaging sensor 9 about each of the x axis, the y axis and the z axis of the camera coordinate system based on a drive voltage (or the target vector) supplied to the motors. Further, a translation transmitting device 9B is connected to the imaging sensor 9, and this translation transmitting device 9B is comprised of a set of piezoelectric elements which apply translation to the imaging sensor 9 along each of the x axis, the y axis and the z axis of the camera coordinate based on a drive voltage (or the target vector) supplied to the piezoelectric elements. The rotation transmitting device 9A and the translation transmitting device 9B are provided in the movement control unit of the digital camera deviation correcting apparatus of FIG. 1A.

The dotted line in FIG. 4 indicates a deviation of the imaging sensor 9 from the reference position which is caused by a slight oscillation of the operator. For the sake of simplicity of description, suppose that the imaging sensor 9 at this time is rotated from the reference position (the solid line) to the deviating position (the dotted line) about the center "O" of the optical system 2 of the digital camera by a rotation angle "$\theta y$" due to the oscillation of the operator.

In this example of FIG. 4, a change of a positional angle of the imaging sensor 9, calculated by the positional angle calculating unit 12 of the digital camera deviation correcting apparatus of FIG. 1A, is equal to the rotation angle "$\theta y$". As being apparent from FIG. 4, in order to correct the deviation of the imaging sensor 9, application of rotation to the imaging sensor 9 about the y axis of the camera coordinate system by a rotation angle "$-\theta y$" is needed to be effected by the movement control unit of the apparatus of FIG. 1A. The rotation transmitting device 9A is driven by the movement control unit so that the imaging sensor 9 is rotated about the y axis by the rotation angle "−θy" through the rotation transmitting device 9A.

In the example of FIG. 4, a distance between the center "O" of the optical system and the center "O'" of the imaging sensor 9 along the z axis is represented by "f". This distance "f" is varying when a zooming function of the digital camera is performed, but the distance "f" can be calculated in accordance with the actual zooming amount when the zooming function is performed. The distance "f" can be considered the known quantity. In the example of FIG. 4, in addition to the rotation about the y axis, the center "O'" of the imaging sensor 9 is translated to the center of the deviating position along the z axis by "f·sin$^2$ θy" and along the x axis by "−f·sin θy·cos θy" due to the oscillation of the operator. Hence, in order to correct the deviation of the imaging sensor 9 into the reference position (the solid line in FIG. 4), application of translation to the center of the imaging sensor 9 along the z axis by "−f·sin$^2$ θy" and along the x axis by "f·sin θy·cos θy" is needed to be effected by the movement control unit of the apparatus of FIG. 1A. The translation transmitting device 9B is driven by the movement control unit so that the center of the imaging sensor 9 is translated along the z axis by "−f·sin$^2$ θy" and along the x axis by "f·sin θy·cos θy" through the translation transmitting device 9B.

Accordingly, in the example of FIG. 4, the target vector calculating unit 14 of the apparatus of FIG. 1A calculates a target vector based on the positional angle change "θy", the target vector describing a magnitude and a direction of an inverse movement of the imaging sensor 9 (including both the above-mentioned rotation and the above-mentioned translation) needed to reach the reference position and cancel the deviation. The inverse movement of the imaging sensor 9 is controlled through the rotation transmitting device 9A and the translation transmitting device 9B based on the calculated target vector, so as to move the imaging sensor 9 from the deviating position (the dotted line) back to the reference position (the solid line).

In the above example of FIG. 4, the application of only the rotation with respect to the y axis has been considered. In addition, the application of only the translations with respect to the z axis and the x axis. The same principles can be extended to include the rotations with respect to the x axis and the z axis as well as the translation with respect to the y axis, so that the application of the rotation about each of the x axis, the y axis and the z axis as well as the application of the translation along each of the x axis, the y axis and the z axis is effected by the movement control unit of the apparatus of FIG. 1A.

In a case in which a translational displacement of the imaging sensor 9 can be detected by the apparatus of FIG. 1A and a change of the positional angle "θ" is very small, the approximation θ=tan θ can be utilized in order to carry out the target vector calculation and the imaging sensor movement in the digital camera deviation correcting apparatus of FIG. 1A.

Figure 2A:
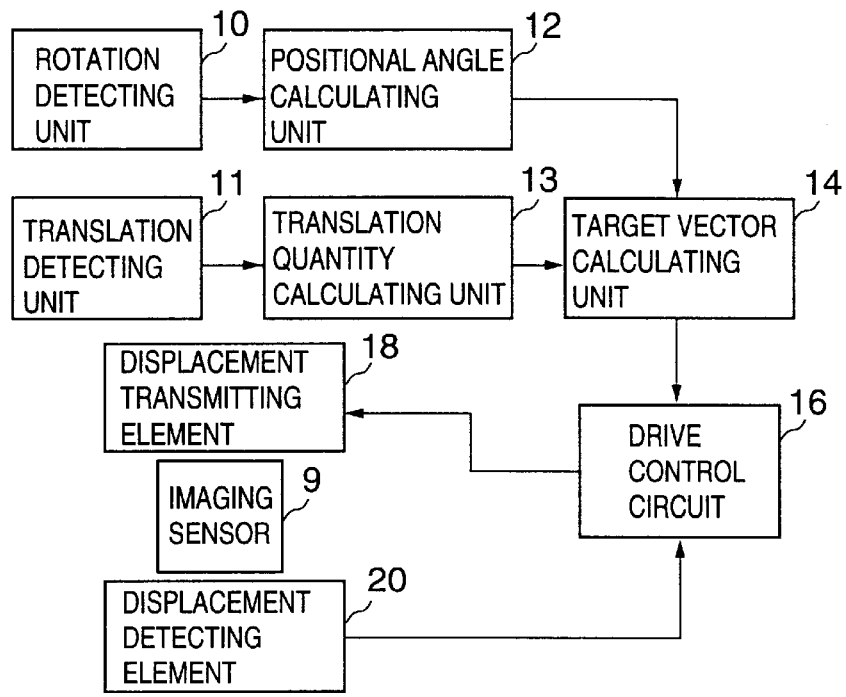
FIG. 2A is a block diagram of another embodiment of the digital camera deviation correcting apparatus of the present invention.

FIG. 2A shows another embodiment of the digital camera deviation correcting apparatus of the present invention. In FIG. 2A, the elements which are the same as corresponding elements in FIG. 1A are designated by the same reference numerals, and a description thereof will be omitted.

As shown in FIG. 2A, the digital camera deviation correcting apparatus of the present embodiment includes a translation detecting unit 11 and a translation quantity calculating unit 13, in addition to the elements of FIG. 1A.

The translation detecting unit 11 detects a quantity of translation of the digital camera along each of the X axis, the Y axis and the Z axis of the world coordinate system, which causes a deviation of the imaging sensor 9 from the reference position to occur. The translation detecting unit 11 is comprised of the acceleration sensors 3, 4 and 5.

The translation quantity calculating unit 13 is connected to the target vector calculating unit 14. The translation quantity calculating unit 13 calculates a change of a quantity of translation of the imaging sensor 9 based on the translation quantity detected by the translation detecting unit 11. The translation quantity calculating unit 13 may include a set of analog-digital converters and a microprocessor with a memory. The accelerations of the digital camera along the X axis, the Y axis and the Z axis of the world coordinate system are provided by the output signals of the acceleration sensors 3, 4 and 5. A translational velocity of the imaging sensor 9 along each axis is calculated by taking the integral of each of the accelerations with respect to time. A translational displacement of the imaging sensor 9 along each of the X axis, the Y axis and the Z axis of the world coordinate system can be calculated by taking the integral of each of the velocity components with respect to time.

In the present embodiment, the target vector calculating unit 14 calculates a target vector based on the positional angle change calculated by the positional angle calculating unit 12 and on the translation quantity change calculated by the translation quantity calculating unit 13.

Figure 2B:
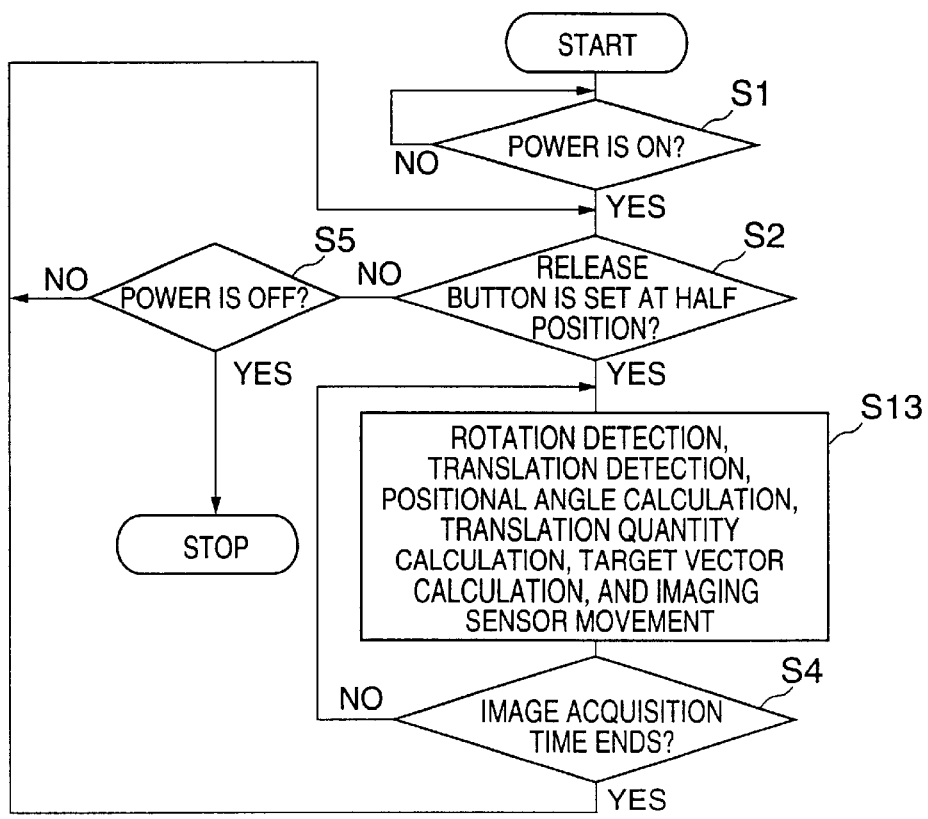
FIG. 2B is a flowchart for explaining another embodiment of the digital camera deviation correcting method of the present invention.

FIG. 2B is a flowchart for explaining another embodiment of the digital camera deviation correcting method of the present invention. The procedures of FIG. 2B are executed by the digital camera deviation correcting apparatus of FIG. 2A. In FIG. 2B, the steps which are the same as corresponding steps in FIG. 1B are designated by the same reference numerals, and a description thereof will be omitted.

As shown in FIG. 2B, the digital camera deviation correcting procedures of the present embodiment are essentially the same as the procedures of FIG. 1B except step S13. In the step S13, the rotation detection, the positional angle calculation, the translation detection, the translation quantity calculation, the target vector calculation and the imaging sensor movement are executed by the elements of the digital camera deviation correcting apparatus of FIG. 2A. In addition to the operations of the step S3 shown in FIG. 1B, the translation detection and the translation quantity calculation are carried out by the element 11 and the element 13 of FIG. 2A. After the step S13 is performed, step S4 determines whether an image acquisition time for a single frame of image data has elapsed. When the image acquisition time has not yet elapsed, the step S13 is repeated. When the image acquisition time has already elapsed, the step S2 is repeated.

According to the digital camera deviation correcting method of FIG. 2B, the digital camera deviation correcting procedures in the step S13 are carried out before the image acquisition of a single frame of image data is complete. It is possible for the digital camera deviation correcting method of the above-described embodiment to provide good quality of a reproduced image as the degradation of quality of a reproduced image due to a slight oscillation of the operator is reliably prevented. It is possible to effectively correct a deviation of the imaging sensor 9 of the digital camera through a more accurate detection of the imaging sensor deviation and a controlled rotational and translational movement of the imaging sensor based on the detection result.

Figure 5:
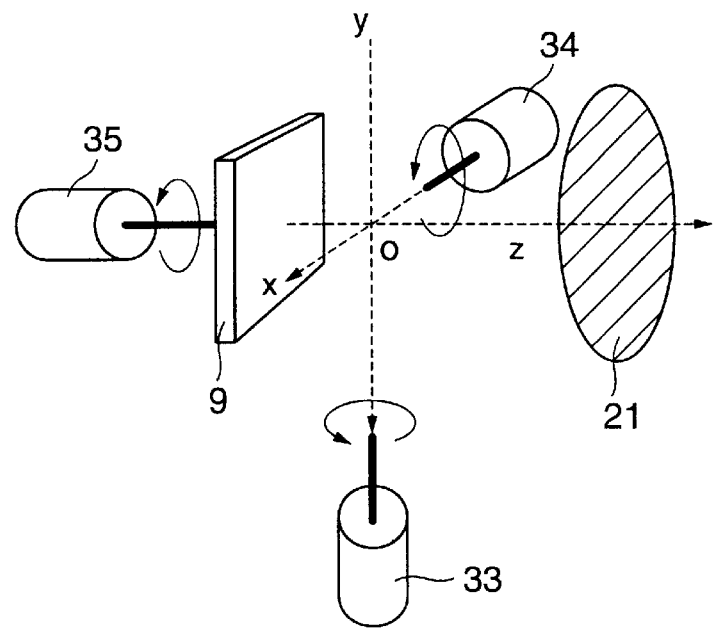
FIG. 5 is a perspective view of one embodiment of an imaging sensor movement mechanism applicable to the digital camera deviation correcting apparatus of the present invention.

FIG. 5 shows one embodiment of an imaging sensor movement mechanism applicable to the digital camera deviation correcting apparatus of the present invention. FIG.

Figure 7:
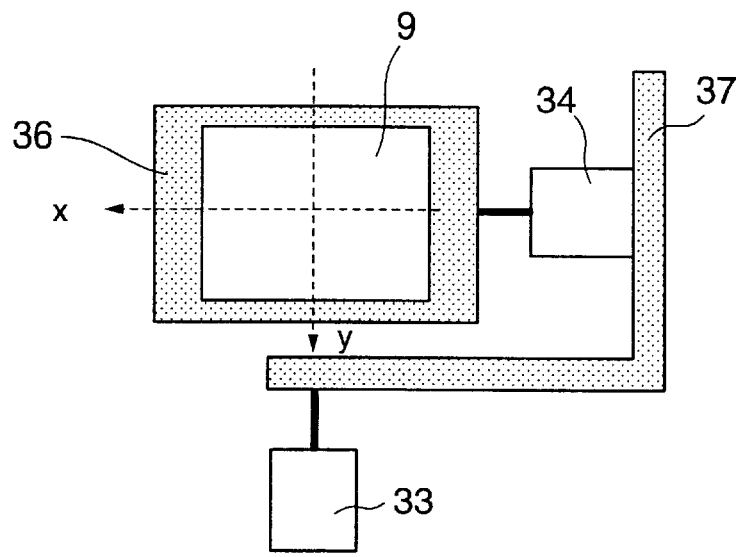
FIG. 7 is a side view of the imaging sensor movement mechanism of FIG. 5 when looking along an optical axis of the digital camera toward the origin of the camera coordinate system.

6 is a top view of the imaging sensor movement mechanism of FIG. 5 when looking along the y axis toward the origin of the camera coordinate system. FIG. 7 is a side view of the imaging sensor movement mechanism of FIG. 5 when looking along the z axis toward the origin of the camera coordinate system.

In the digital camera deviation correcting apparatus incorporating the imaging sensor movement mechanism of FIG. 5 therein, the acceleration sensors 3, 4 and 5 and the magnetic sensors 6, 7 and 8, which constitute the rotation detecting unit 10 of the digital camera deviation correcting apparatus of the embodiment of FIG. 1A, are provided. The 3D (three-dimensional) rotation components of a change of the positional angle of the imaging sensor 9 from the reference position are detected, and the imaging sensor movement mechanism of FIG. 5 achieves an inverse rotation of the imaging sensor 9 in the 3D manner so as to correct a deviation of the imaging sensor 9 and move the imaging sensor 9 back to the reference position.

As shown in FIG. 5, in the digital camera to which the present embodiment is applied, an image of an object or a scene is formed through a camera lens 21 onto an image plane of the imaging sensor 9 (comprised of the CCD) so that the imaging sensor 9 outputs a digital image signal. The digital camera deviation correcting apparatus of the present embodiment is provided for correcting a deviation of the imaging sensor 9 which may be produced by a slight oscillation of the human hand in taking a photograph using the digital camera.

Figure 6:
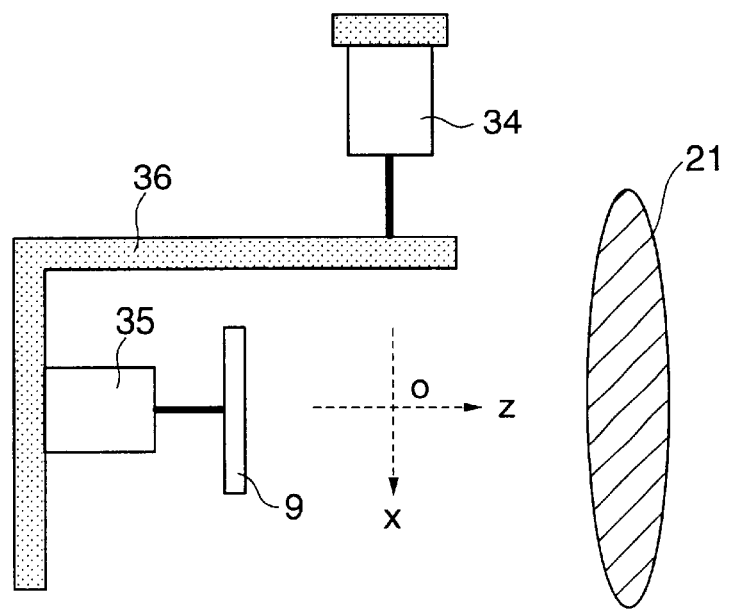
FIG. 6 is a top view of the imaging sensor movement mechanism of FIG. 5 when looking along a vertical rotation axis toward the origin of a camera coordinate system.

The camera coordinate system (x, y, z) is taken to the digital camera in a manner similar to that of FIG. 3. Preferably, the origin "O" of the camera coordinate system (x, y, z) accords with the center of the optical system (or the focal point of the camera lens 21). In the imaging sensor movement mechanism of FIG. 5, a set of motors 33, 34 and 35 are provided to respectively apply rotation to the imaging sensor 9 about the y axis, the x axis and the z axis of the camera coordinate system based on a target vector. FIG. 6 shows a connection of the motor 34 and the motor 35 which are held in the digital camera, and FIG. 7 shows a connection of the motor 33 and the motor 34 which are held in the digital camera.

As shown in FIG. 6, the motor 35 has a rotary shaft fixed to the center of the imaging sensor 9 (the CCD), and the rotary shaft of the motor 35 is rotated about the z axis of the camera coordinate system. The motor 35 has a base secured to a first rectangular surface of an L-shaped member 36. The L-shaped member 36 includes a second rectangular surface which is perpendicular to the first rectangular surface and parallel to the yz plane. The motor 34 has a rotary shaft fixed to the second rectangular surface of the L-shaped member 36. The rotary shaft of the motor 34 is rotated about the x axis of the camera coordinate system. When the rotary shaft of the motor 34 is rotated, the imaging sensor 9 and the motor 35 are rotated together about the x axis through the L-shaped member 36.

As shown in FIG. 7, the motor 34 has a base secured to a first rectangular surface of an L-shaped member 37. The L-shaped member 37 includes a second rectangular surface which is perpendicular to the first rectangular surface and parallel to the xz plane. The motor 33 has a rotary shaft fixed to the second rectangular surface of the L-shaped member 37. The motor 33 has a base secured to the main body of the digital camera (which is not shown in FIG. 7). The rotary shaft of the motor 33 is rotated about the y axis of the camera coordinate system. When the rotary shaft of the motor 33 is rotated, the motor 34, the motor 35 and the L-shaped member 37 are rotated together about the y axis through the L-shaped member 37.

Similar to the calculation of the positional angle change of FIG. 3, the digital camera was initially in the reference position at the time t, and the rotation angles θx(t) and θz(t) of the imaging sensor 9 are determined in accordance with the above equations (1). The rotation angle θy(t) of the imaging sensor 9 is determined in accordance with the above equation (2).

The application of the rotation transformations at the time (t+1) can be represented by the above equation (3). From the above equation (3), a change of the positional angles of the imaging sensor 9 of the digital camera between the initial time t and the following time (t+1) can be determined.

Assuming that the change of the positional angles of the imaging sensor 9 is determined as $\theta^r x(t+1)$, $\theta^r y(t+1)$ and $\theta^r z(t+1)$, the motors 34, 33 and 35 are controlled based on the target vector to respectively apply rotation to the imaging sensor 9 about the x axis by $-\theta^r x(t+1)$, about the y axis by $-\theta^r y(t+1)$ and about the z axis by $-\theta^r z(t+1)$, so as to cancel the deviation of the imaging sensor 9 and move the imaging sensor 9 back to the reference position.

Figure 8:
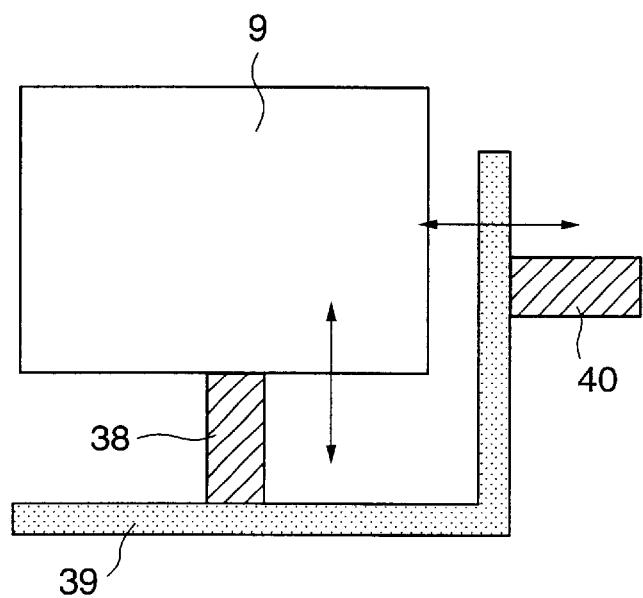
FIG. 8 is a side view of another embodiment of the imaging sensor movement mechanism applicable to the digital camera deviation correcting apparatus of the present invention.

FIG. 8 shows another embodiment of the imaging sensor movement mechanism which is applicable to the digital camera deviation correcting apparatus of the present invention.

In the digital camera deviation correcting apparatus incorporating the imaging sensor movement mechanism of FIG. 8 therein, a 2D (two-dimensional) gyro, which constitutes the rotation detecting unit 10 of the digital camera deviation correcting apparatus of the embodiment of FIG. 1A, is provided. The 2D gyro detects angular velocities of the imaging sensor 9 with respect to the x axis and the y axis of the camera coordinate system. The 2D rotation components of a change of the positional angle of the imaging sensor 9 from the reference position are detected, and the imaging sensor movement mechanism of FIG. 8 achieves an inverse translation of the imaging sensor 9 in the 2D manner so as to correct a deviation of the imaging sensor 9 and move the imaging sensor 9 back to the reference position. In this case, the rotational movement of the digital camera is considerably small, and it is achieved only by translation with no rotation taking place.

Figure 9:
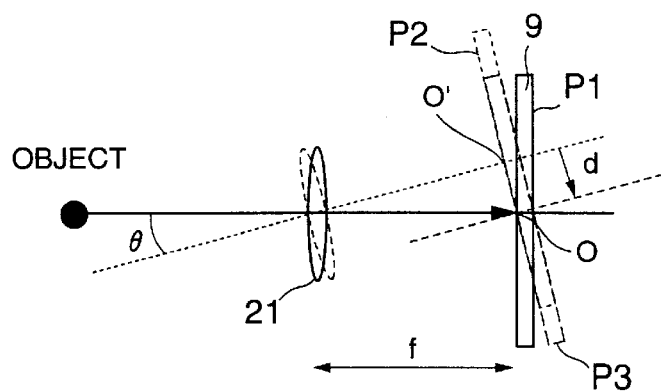
FIG. 9 is a diagram for explaining the principles of the digital camera deviation correcting apparatus with the imaging sensor movement mechanism of FIG. 8 being incorporated therein.

FIG. 9 shows the principles of the digital camera deviation correcting apparatus with the imaging sensor movement mechanism of FIG. 8 being incorporated therein.

As shown in FIG. 9, in the digital camera to which the present embodiment is applied, an image of an object is formed through the camera lens 21 onto the image plane of the imaging sensor 9 (comprised of the CCD). The center of the image of the object on the image plane of the imaging sensor 9 is indicated by "O" in FIG. 9. The reference position (the solid line in FIG. 9) of the imaging sensor 9 is indicated by "P1" in FIG. 9. A distance between the center of the imaging sensor 9 and the center of the camera lens 21 is indicated by "f" in FIG. 9.

Suppose that the digital camera is rotated by a rotation angle "θ" with respect to the optical axis of the camera lens 21 (or the z axis of the camera coordinate system) due to a slight oscillation of the operator. The rotation angle "θ" is very small. The image plane of the imaging sensor 9 is moved from the reference position "P1" to a deviating position "P2" (the dotted thin line in FIG. 9) due to the deviation of the imaging sensor 9. The center of the image of the object on the image plane of the imaging sensor 9 at the deviating position "P2" is indicated by "O'" in FIG. 9.

In the example of FIG. 9, in order to correct the deviation of the imaging sensor 9, application of translation to the center of the imaging sensor 9 by the distance d =f·tan θ. After the translation is applied, the imaging sensor 9 is moved from the deviating position "P2" to a corrected position "P3" (the dotted thick line in FIG. 9). As the rotation angle "θ" is very small, the approximation θ=tan θ can be utilized. Hence, application of the translation to the center of the imaging sensor 9 by the distance d=f19 θ is needed to be effected by the movement control unit of the apparatus of FIG. 1A.

Assuming that the change of the positional angles of the imaging sensor 9 is calculated as $\theta^r_y(t+1)$ and $\theta^r_z(t+1)$, the application of translation to the imaging sensor 9 along the y axis by $-f \cdot \theta^r_y(t+1)$ and along the z axis by $-f \cdot \theta^r_z(t+1)$, so as to cancel the deviation of the imaging sensor 9 and move the imaging sensor 9 back to the reference position. The output signals of the 2D gyro are the angular velocities of the imaging sensor 9, and the change of the positional angles can be calculated by taking the integral of each of the velocity components from the time t to the time (t+1).

In the embodiment of the imaging sensor movement mechanism of FIG. 8, a piezoelectric element 38 is secured at one end to the base of the imaging sensor 9 (the CCD). The piezoelectric element 38 is secured at the other end to a first surface of an L-shaped member 39. The piezoelectric element 38 is provided to apply translation of the imaging sensor 9 along the y axis of the camera coordinate system. The L-shaped member 39 has a second surface which is perpendicular to the first surface and parallel to the y axis. A piezoelectric element 40 is secured at one end the second surface of the L-shaped member 39, and secured at the other end to the main body of the digital camera. The piezoelectric element 40 is provided to apply translation of the imaging sensor 9 along the x axis of the camera coordinate system. Accordingly, the imaging sensor movement mechanism of FIG. 8 achieves an inverse translation of the imaging sensor 9 in the 2D manner so as to correct a deviation of the imaging sensor 9 and move the imaging sensor 9 back to the reference position.

Figure 10:
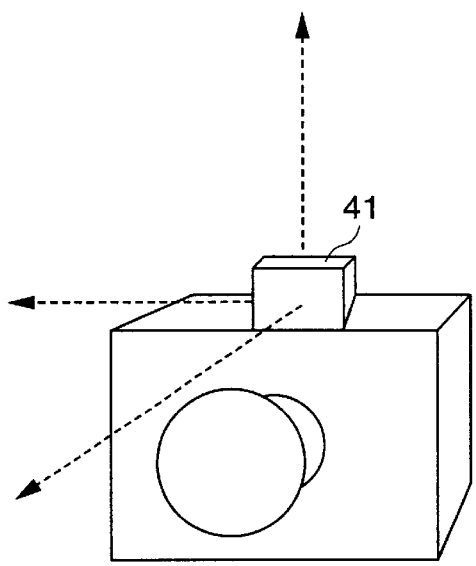
FIG. 10 is a perspective view of one embodiment of a translation detecting device applicable to the digital camera deviation correcting apparatus of the present invention.

FIG. 10 shows an embodiment of a translation detecting device which is applicable to the digital camera deviation correcting apparatus of the present invention.

As shown in FIG. 10, a range finder 41 is provided on the digital camera, and this range finder 41 measures distances of objects from the digital camera along three lines, indicated by the three arrows in FIG. 10, which are all perpendicular to each other. The range finder 41 acts as the translation detecting device which detects a quantity of translation of the digital camera in the digital camera deviation correcting apparatus of the present invention.

In the digital camera deviation correcting apparatus with the translation detecting device 41 incorporated therein, the acceleration sensors 3, 4 and 5 and the magnetic sensors 6, 7 and 8 are also provided. The acceleration sensors 3, 4 and 5 and the magnetic sensors 6, 7 and 8 constitute the rotation detecting unit of the digital camera deviation correcting apparatus of the present embodiment. The positional angle calculation is carried out based on the output signals of these sensors 3 through 8 in the same manner as the above-described positional angle calculation with reference to FIG. 3.

In the digital camera deviation correcting apparatus with the translation detecting device 41 incorporated therein, a translation quantity calculation is carried out based on output signals of the range finder 41 as follows.

As described above, the range finder 41 outputs signals indicative of distances between objects and the digital camera in the three directions. If three distant fixed objects in the three directions are given, the range finder 41 outputs the signals indicating the distances of the fixed objects from the digital camera.

Suppose that the range finder 41 has output the distance signals [dx(t), dy(t), dz(t)] at the initial time t and the distance signals [dx(t+1), dy(t+1), dz(t+1)] at the following time t+1. A change of quantity of translation of the imaging sensor of the digital camera which may be produced by a slight oscillation of the operator is represented by [−(dx(t+1)−dx(t)), dy(t+1)−dy(t), −(dz(t+1)−dz(t))]. Hence, if the positional angle change is not considered, the target vector describing a magnitude and a direction of an inverse translation of the imaging sensor 9 needed to reach the reference position and cancel the deviation is represented by [dx(t+1)−dx(t), −(dy(t+1)−dy(t)), dz(t+1)−dz(t)].

In the digital camera deviation correcting apparatus with the translation detecting device 41 incorporated therein, the target vector calculating unit calculates the target vector based on the calculated positional angle change and on the calculated translation quantity change as in the embodiment of FIG. 2A.

Figure 11:
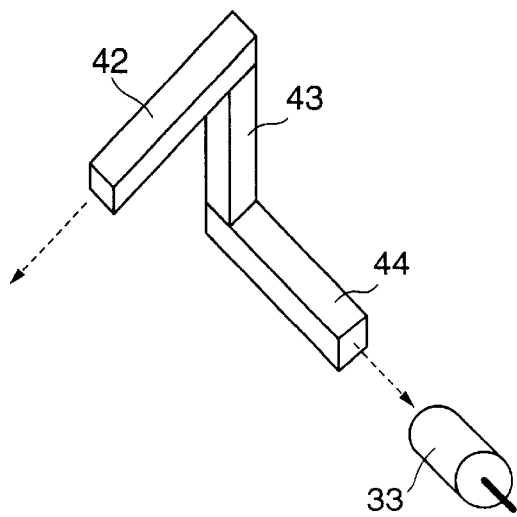
FIG. 11 is a perspective view of one embodiment of a translation transmitting device applicable to the digital camera deviation correcting apparatus of the present invention.

FIG. 11 shows one embodiment of a translation transmitting device which is applicable to the digital camera deviation correcting apparatus of the present invention.

As shown in FIG. 11, piezoelectric elements 42, 43 and 44 are linked together such that the piezoelectric elements 42, 43 and 44 are aligned with the x axis, the y axis and the z axis of the camera coordinate system. One end of the piezoelectric element 42 is fixed to the main body of the digital camera. One end of the piezoelectric element 44 is fixed to the motor 33 of the imaging sensor movement mechanism of FIG. 5. By supplying a drive signal from the drive control circuit to each of the piezoelectric elements 42–44, each piezoelectric element achieves a translational movement of the imaging sensor 9 along one of the x axis, the y axis and the z axis of the camera coordinate system so as to cancel the deviation of the imaging sensor 9.

The piezoelectric elements 42, 43 and 44 act as the translation transmitting device which achieves a translational movement of the imaging sensor 9 based on the calculated target vector in the digital camera deviation correcting apparatus of the present invention. By utilizing the translation transmitting device of FIG. 11 and the rotation transmitting device of FIG. 5 in combination, the movement control unit in the digital camera deviation correcting apparatus of the present invention can be constituted. This movement control unit controls rotational and translational movements of the imaging sensor 9 based on the calculated target vector, so that the imaging sensor 9 is moved back to the reference position thus correcting the deviation.

Further, the present invention is not limited to the above-described embodiments, and variations and modifications may be made without departing from the scope of the present invention.

What is claimed is:

1. An apparatus for correcting a deviation of an imaging sensor of a digital camera in which an image of an object or a scene is formed on an image plane of the imaging sensor so that the imaging sensor outputs an image signal, comprising:

a rotation detecting unit which detects a quantity of rotation of the digital camera causing a deviation of the imaging sensor from a reference position to occur, the rotation detecting unit including an acceleration sensor outputting a signal indicative of an acceleration of the digital camera and a magnetic sensor outputting a signal indicative of a magnetic field of the digital camera;

a positional angle calculating unit which calculates a change of a positional angle of the imaging sensor based on the rotation quantity detected by the rotation detecting unit;

a target vector calculating unit which calculates a target vector based on the positional angle change calculated by the positional angle calculating unit, the target vector describing a magnitude and a direction of an inverse movement of the imaging sensor needed to reach the reference position and cancel the deviation; and a movement control unit which controls movement of the imaging sensor based on the target vector calculated by the target vector calculating unit, so that the imaging sensor is moved back to the reference position thus correcting the deviation, wherein the calculation of the target vector and the movement of the imaging sensor are executed within an image acquisition time for a single frame of the image signal.

2. The apparatus as claimed in claim 1, further comprising:

a translation detecting unit which detects a quantity of translation of the digital camera causing the deviation of the imaging sensor from the reference position to occur; and a translation quantity calculating unit, connected to the target vector calculating unit, which calculates a change of a quantity of translation of the imaging sensor based on the translation quantity detected by the translation detecting unit, wherein the target vector calculating unit calculates a target vector based on the positional angle change calculated by the positional angle calculating unit and on the translation quantity change calculated by the translation quantity calculating unit.

3. The apparatus as claimed in claim 1, wherein the rotation detecting unit includes a set of acceleration sensors provided to output signals indicative of accelerations of the digital camera along an X axis, a Y axis and a Z axis of a world coordinate system, and a set of magnetic sensors provided to output signals indicative of magnetic fields of the digital camera along the X axis, the Y axis and the Z axis of the world coordinate system.

4. The apparatus as claimed in claim 2, wherein the rotation detecting unit includes a set of acceleration sensors provided to output signals indicative of accelerations of the digital camera along an X axis, a Y axis and a Z axis of a world coordinate system, and both the quantity of rotation of the digital camera and the quantity of translation of the digital camera are detected based on the output signals of the acceleration sensors in common.

5. The apparatus as claimed in claim 1, wherein the detection of the rotation, the calculation of the target vector and the movement of the imaging sensor are executed in less than 1/30 seconds.

6. The apparatus as claimed in claim 1, wherein the movement control unit includes a drive control circuit, a displacement transmitting element connected to the imaging sensor and a displacement detecting element connected to the imaging sensor, the drive control circuit driving the displacement transmitting element to move the imaging sensor, the displacement detecting element detecting a resulting displacement of the imaging sensor given by the displacement transmitting element, and the displacement detecting element outputting a detection signal to the drive control circuit.

7. The apparatus as claimed in claim 1, wherein the movement control unit includes a set of motors provided to achieve rotation of the imaging sensor about each of an x axis, a y axis and a z axis of a camera coordinate system based on the target vector.

8. The apparatus as claimed in claim 2, wherein the movement control unit includes a set of motors provided to achieve rotation of the imaging sensor about each of an x axis, a y axis and a z axis of a camera coordinate system based on the target vector, and a set of piezoelectric elements provided to achieve translation of the imaging sensor along each of the x axis, the y axis and the z axis of the camera coordinate system based on the target vector.

9. A method of correcting a deviation of an imaging sensor of a digital camera in which an image of an object or a scene is formed on an image plane of the imaging sensor so that the imaging sensor outputs an image signal, comprising:

detecting a quantity of rotation of the digital camera causing a deviation of the imaging sensor from a reference position to occur, the rotation quantity being detected based on the output signal of an acceleration sensor indicative of an acceleration of the digital camera and an output signal of a magnetic sensor indicative of a magnetic field of the digital camera;

calculating a change of a positional angle of the imaging sensor based on the detected rotation quantity;

calculating a target vector based on the calculated positional angle change, the target vector describing a magnitude and a direction of an inverse movement of the imaging sensor needed to reach the reference position and cancel the deviation; and controlling movement of the imaging sensor based on the calculated target vector, so that the imaging sensor is moved back to the reference position thus correcting the deviation, wherein the calculation of the target vector and the movement of the imaging sensor are executed within an image acquisition time for a single frame of the image signal.

10. The method as claimed in claim 9, further comprising:

detecting a quantity of translation of the digital camera causing the deviation of the imaging sensor from the reference position to occur; and calculating a change of a quantity of translation of the imaging sensor based on the detected translation quantity, wherein said calculating of the target vector is executed based on the calculated positional angle change and on the calculated translation quantity change.

* * * * *